United States Patent
Gogri et al.

(10) Patent No.: US 9,773,249 B2
(45) Date of Patent: Sep. 26, 2017

(54) METHOD AND SYSTEM FOR PRESENTING TARGETED ADVERTISEMENTS

(75) Inventors: Pinank Gogri, Mountain View, CA (US); Michael Mulvihill, Redwood City, CA (US); Hayrettin Kolukisaoglu, Sunnyvale, CA (US); Shamik Sharma, Sunnyvale, CA (US); Sundeep Tirumalareddy, Santa Clara, CA (US)

(73) Assignee: Excalibur IP, LLC, New York, NY (US)

(*) Notice: Subject to any disclaimer, the term of this patent is extended or adjusted under 35 U.S.C. 154(b) by 1777 days.

(21) Appl. No.: 12/028,712

(22) Filed: Feb. 8, 2008

(65) Prior Publication Data
US 2009/0204474 A1 Aug. 13, 2009

(51) Int. Cl.
*G06Q 30/00* (2012.01)
*G06Q 30/02* (2012.01)

(52) U.S. Cl.
CPC ......... *G06Q 30/02* (2013.01); *G06Q 30/0226* (2013.01); *G06Q 30/0263* (2013.01)

(58) Field of Classification Search
USPC .......................................................... 705/14
See application file for complete search history.

(56) References Cited

U.S. PATENT DOCUMENTS

| | | | |
|---|---|---|---|
| 2006/0069784 A2* | 3/2006 | Hsu et al. | 709/228 |
| 2007/0073585 A1* | 3/2007 | Apple et al. | 705/14 |
| 2007/0220042 A1* | 9/2007 | Mueller et al. | 707/102 |
| 2009/0076886 A1* | 3/2009 | Dulitz et al. | 705/10 |
| 2009/0132368 A1* | 5/2009 | Cotter | G06Q 30/0257 705/14.55 |
| 2009/0177537 A1* | 7/2009 | Taylor | G06Q 30/02 705/14.69 |
| 2010/0094867 A1* | 4/2010 | Badros | G06Q 30/02 707/725 |
| 2010/0274675 A1* | 10/2010 | Lee | G06Q 30/02 705/14.73 |
| 2011/0238508 A1* | 9/2011 | Koningstein | 705/14.73 |
| 2013/0254031 A1* | 9/2013 | Jambunathan et al. | 705/14.54 |

\* cited by examiner

*Primary Examiner* — Alvin L Brown
(74) *Attorney, Agent, or Firm* — Brinks Gilson & Lione

(57) ABSTRACT

A system and method may add to a web page a similar-content module which may contain information related to the context of the web page, may look like a portion of the web page, and may lead to a jump page which presents information in the similar-content module in more detail and contains an advertiser's advertisement or a link to an advertiser's web page. If a user is interested in the information in the similar-content module, he may click on the module and be sent to the jump page. Displaying the similar-content module will not cost any advertiser anything. A pay per impression advertiser will not be charged until its advertisement is displayed on the jump page, and a pay per click advertiser will not be charged until its link in the jump page is clicked on.

25 Claims, 4 Drawing Sheets

METHOD AND SYSTEM FOR PRESENTING TARGETED ADVERTISEMENTS

BACKGROUND

Field of the Invention

The present invention relates generally to online advertising, and more particularly to a method for presenting advertisements which are targeted at users engaged in particular browsing activities.

Description of Related Art

With the growth of the Internet, online advertising is becoming more and more important for advertisers (buyers of advertising spaces, e.g., Coca Cola™ and Nike™). An advertiser may pay an advertising network a certain amount of money for a certain number of impressions. The advertising network may put the advertisement on web pages of different publishers (websites selling advertising space, e.g., www.yahoo.com, and www.cnn.com), displaying the advertisement when a user (anybody browsing a website) browses the publisher's website. One problem with this approach is that it may irritate users, since the advertisement may significantly reduce display areas on the web page available for content and a user may have no interest in the advertisement at all. A second problem is that it may waste an advertiser's money, since the advertiser has to pay for an impression even when a user is not interested in the advertisement.

In another approach, instead of displaying an advertisement, the advertisement network may display a link to an advertiser's web page together with a brief introduction of content of the advertiser's web page. When a user looks at the brief introduction and is interested in the advertiser's web page, he may click on the link. The advertiser may be charged a certain amount of money each time the link to its web page is clicked on. One problem with this approach is that the user may not get enough information about an advertiser's web page through the brief introduction, and so may click on the link to the advertiser's web page and only then realize it is not what he wants. This may waste the user's time and the advertiser's money. A further problem is that users may know that the links are for advertising and may simply ignore them.

Another problem with the above approaches is that they may not target specific groups of potential customers with satisfactory precision.

Therefore, it may be desirable to provide a system and method which may help to present an advertisement only to interested users so as to reduce advertisers' cost, avoid annoying disinterested users, and improve advertising effectiveness.

BRIEF DESCRIPTION OF THE DRAWING FIGURES

Embodiments of the present invention are described herein with reference to the accompanying drawings, similar reference numbers being used to indicate functionally similar elements.

DETAILED DESCRIPTION

The present invention provides a system and method which may add to a web page a similar-content module which may contain information related to the context of the web page, may look like a portion of the web page, and may lead to a jump page which presents information in the similar-content module in more detail and contains an advertiser's advertisement or a link to an advertiser's web page. If a user is interested in the information in the similar-content module, he may click on the module and be sent to the jump page. Displaying the similar-content module will not cost any advertiser anything. A pay per impression advertiser will not be charged until its advertisement is displayed on the jump page, and a pay per click advertiser will not be charged until its link in the jump page is clicked on. Since only interested users may click on the similar-content module, the present invention may avoid annoying a user by displaying an advertisement in which he is not interested, and avoid spending the advertiser's money on disinterested users.

The present invention may further collect information about a user, and fine tune information in the similar-content module accordingly. The present invention may also match the color, font and style of the similar-content module to those of the web page so as to make the module look like an integrated portion of the web page, instead of a module for advertising purposes. The invention may be carried out by computer-executable instructions, such as program modules. Advantages of the present invention will become apparent from the following detailed description.

Figure 1:
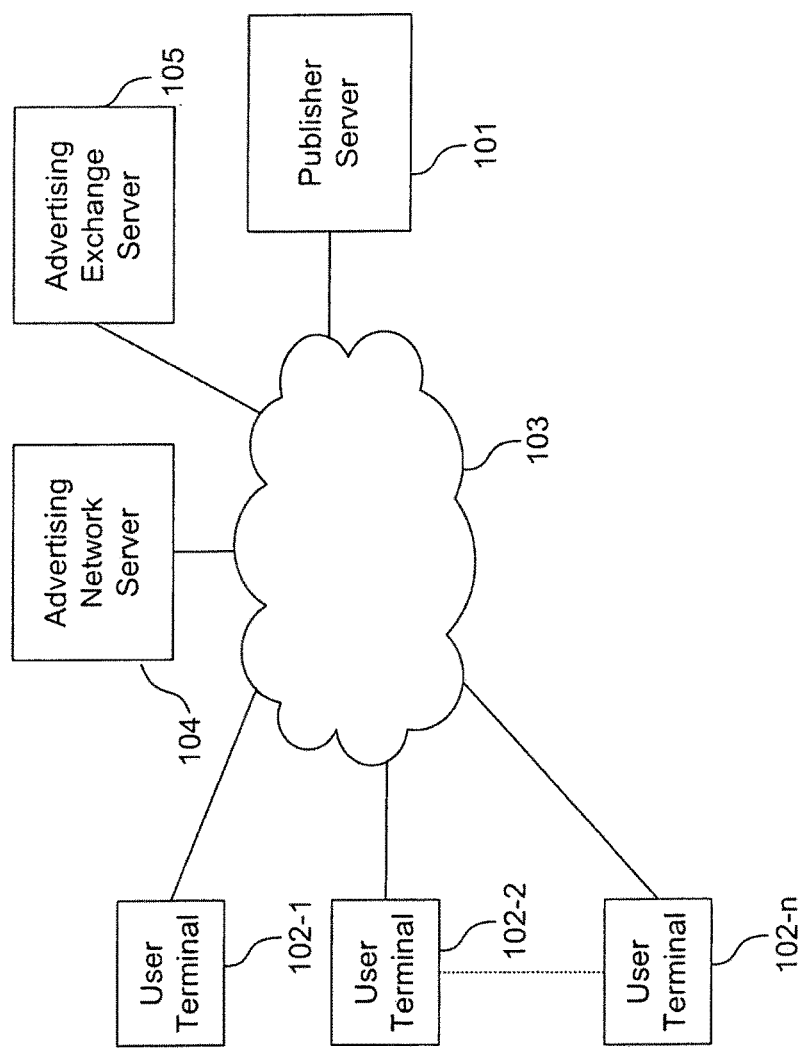
FIG. 1 illustrates an exemplary environment in which a system of the present invention may be used.

FIG. 1 illustrates an exemplary environment in which a system of the present invention may be used. As shown, a publisher server 101 may communicate over a network 103 with a number of user terminals 102-1, 102-2, ... 102-n. The publisher server 101 may be a computer system and may control the operation of a website or a blog. The user terminals 102 may be personal computers, handheld or laptop devices, microprocessor-based systems, set top boxes, or other programmable consumer electronics. Each user terminal may have a browser application configured to receive and display web pages, which may include text, graphics, multimedia, etc. The web pages may be based on, e.g., HyperText Markup Language (HTML) or extensible markup language (XML). One or more advertisements may be displayed on a web page. Network connectivity may be wired or wireless, using one or more communications protocols, as will be known to those of ordinary skill in the art.

An advertising network server 104 and/or advertising exchange server 105 may be coupled to the network 103 to send advertisements to publisher servers according to agreements between publishers, advertisers and the advertising network or advertising exchange. As mentioned above, the agreement may be, e.g., that the advertising network or advertising exchange should display an advertiser's advertisement on certain websites for a certain number of impressions, in return for a certain amount of money from the advertiser. Another example of the agreement may be that an advertiser should pay the advertising network an amount of money each time a link to the advertiser's website is clicked on.

Figure 2:
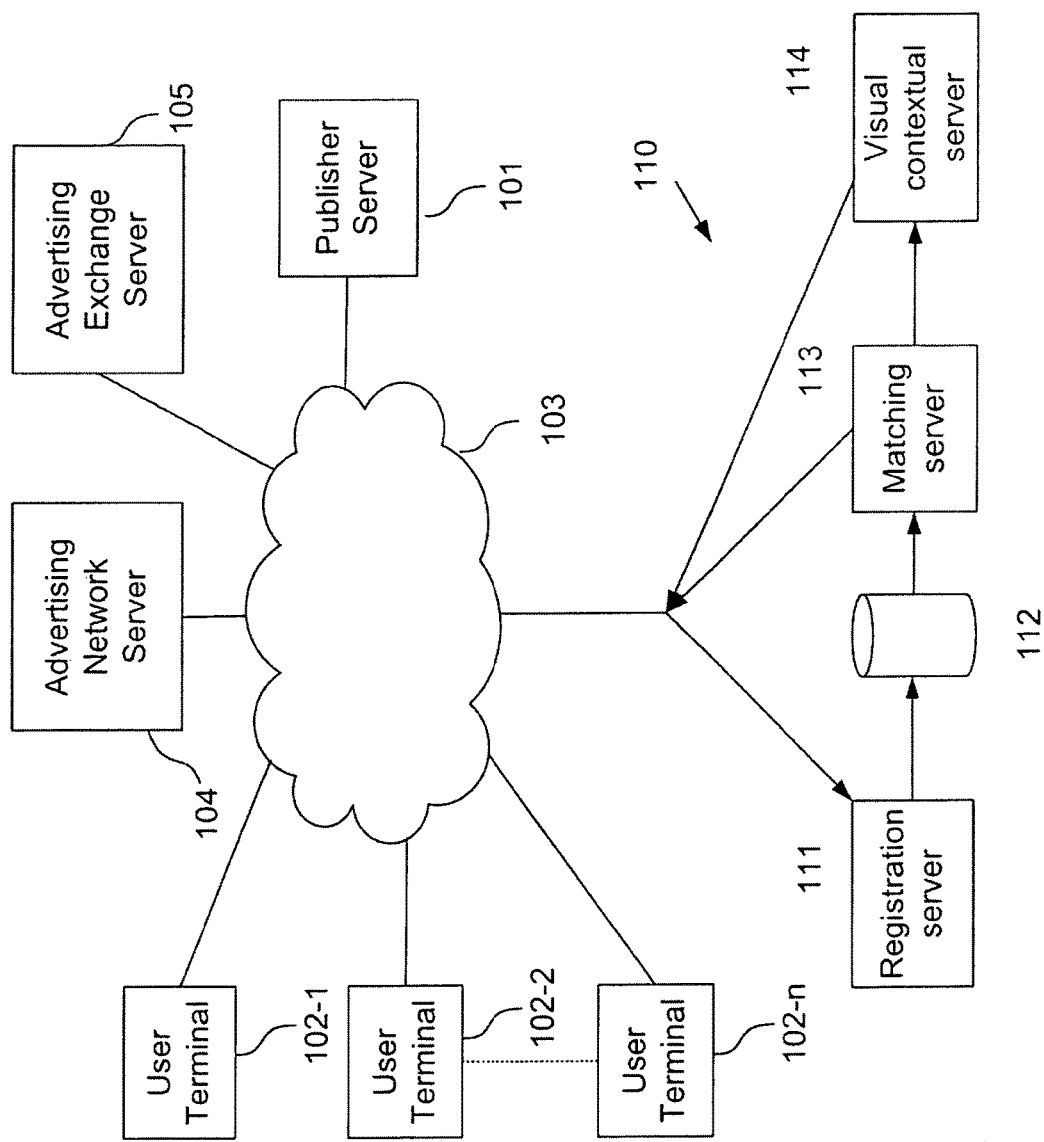
FIG. 2 illustrates a system for presenting targeted advertisements according to one embodiment of the present invention, used in the exemplary environment shown in FIG. 1.

FIG. 2 illustrates a system according to one embodiment of the present invention, used in the exemplary environment shown in FIG. 1. As shown, a targeted advertising presentation system 110 may be coupled to the network 103 and communicate with publisher servers 101, user terminals 102, and advertising network servers 104 and/or advertising exchange servers 105. The targeted advertising presentation system 110 may have a registration server 111, a registration database 112 and a matching server 113. The system 110 may further have a visual contextual server 114.

Each of the servers 111, 113 and 114 may be a computer system, which may include one or more of a screen, an input device, a processing unit, a system memory, and a system bus coupling various components in the computer system. The servers 111, 113 and 114 may control processes related to presentation of targeted advertisement, including but not limited to those described below with reference to FIGS. 3A and 3B. Although FIG. 2 shows three separate servers 111, 113 and 114, it should be understood that these servers may be integrated into fewer than three servers, and even into one server.

Any publisher websites, including blogs, may sign up with the system 110 via the registration server 111. A publisher website may agree to include code that displays targeted advertising in exchange for a revenue share. During the registration, a publisher website may provide its URL to the registration server 111. In one embodiment, the publisher website may provide to the registration server 111 one or more keywords relating to its context. In one example, the web page may be a blog about image stabilization technology in digital cameras and the keywords may be, e.g., "camera", "digital" and "stabilization." Publisher website registration information may be stored in the registration database 112.

When a user asks to view a web page signed up with the system 110 by inputting the URL of the web page, before presenting the web page to the user, code on the web page may call the system 110 with the URL. The matching server 113 may decide the context of the web page. In one embodiment, the matching server 113 may decide the context of the web page by one or more keywords. In one embodiment, the matching server 113 may access the registration database 112 to get the keyword(s) of the context of the web page. In one embodiment, the matching server 113 may crawl the web page to determine the keyword(s) related to its context. In one embodiment, the matching server 113 may look at the intent of a keyword occurring on the web page. Intent for an individual keyword may be determined based on what users do generally after searching for those keywords using a search engine. For example, if a majority of users buy a camera after searching for the word "camera" on a search engine, the intent of keyword "camera" is shopping. The matching server may also use a user's input in a search box as the keyword(s).

If there are more than one keywords, the matching server 113 may rank the keywords based on, e.g., how often they occur on the web page, where they occur on the web page, etc. In one embodiment, a keyword which appears more often on a web page may get a higher ranking. In another embodiment, a keyword which appears earlier on a web page may get a higher ranking. In one embodiment, when a web page is about a camera bought at an on-line store, the matching server 113 may assign a higher ranking to the keyword "camera" than to the keyword "on-line store."

The matching server 113 may collect information about users to further improve targeting accuracy. In one embodiment, the matching server 113 may determine the user's geographic location by, e.g., cookies or the user's IP address. With the geographic location information, the matching server 113 may determine shopping offers or services available in the user's area. In another embodiment, the matching server 113 may determine the user's recent intent while browsing the Internet by using the user's browsing history, or keywords the user recently used. If the user has browsed information about a certain brand of camera, the matching server 113 may give higher priority to that brand.

Once the matching server 113 decides the context of the web page, it may use the keyword(s) or ranked keyword(s) as a filter to fetch listings relevant to the context. The matching server may also consider the user information when fetching advertisements. For example, for the blog describing image stabilization technology in digital cameras, the matching server 113 may decide that the context of the web page is about "camera" and "image stabilization." The matching server 113 may fetch shopping offers for digital cameras with the image stabilization technology, users' comments on various cameras with such feature, information about stores selling cameras with the feature, etc.

The matching server 113 may format the fetched information into a similar-content module to be displayed on the web page. In one embodiment, the similar-content module may include a regional map, with markings denoting locations of stores selling cameras. The similar-content module may also include a list of best-selling digital cameras with image stabilization technology. The similar-content module may further include user comments on the best sellers. The similar-content module may look more like a portion of the web page or a guide, and less like an advertisement. It does not include any advertisement of any advertiser and displaying the similar-content module will not cost any advertiser anything.

If the user is interested in the information in the similar-content module, he may click on the module and be sent to a jump page, which is generated by the matching server 113 with the fetched advertisements and probably user information. The jump page may present information in the similar-content module, e.g., user comments, in more detail. The jump page may present information in the similar-content module in a user interactive way. If the location of a store is marked on the map, the user may be sent to the website of the store if he clicks on the location. In another example, a name of a best-selling camera may be a link to an offer for that camera. The jump page may include advertisements of manufacturers of digital cameras with image stabilization technology, or stores selling such cameras. The jump page may further include links to the website of such manufacturers or stores.

If a user is interested in the web page, which is about digital cameras with image stabilization technology, it is likely that the user may be interested in information in the similar-content module, and click on the module to get the jump page. If a user is interested in a store, he may click on the location of the store on the jump page and then take a look at the website of the store. If a user is interested in a best-selling camera, he may click on the name of the camera on the jump page, and then review information about that camera more carefully. Consequently, information in the similar-content module may be better targeted at users and less irritating, and the advertising may be more effective.

A pay per impression advertiser will not be charged until its advertisement is displayed on the jump page, and a pay per click advertiser will not be charged until its link in the jump page is clicked on. Since only interested users may click on the similar-content module, the present invention may avoid annoying a user by displaying an advertisement in which he is not interested, and avoid spending advertisers' money on disinterested users.

The visual contextual server 114 may further match the look and feel of the similar-content module with the web page on which it is displayed. In one embodiment, the visual contextual server 114 may harmonize the color, font and style of the similar-content module to make the module look like an integrated portion of the web page, instead of a module for advertising.

Figure 3A:
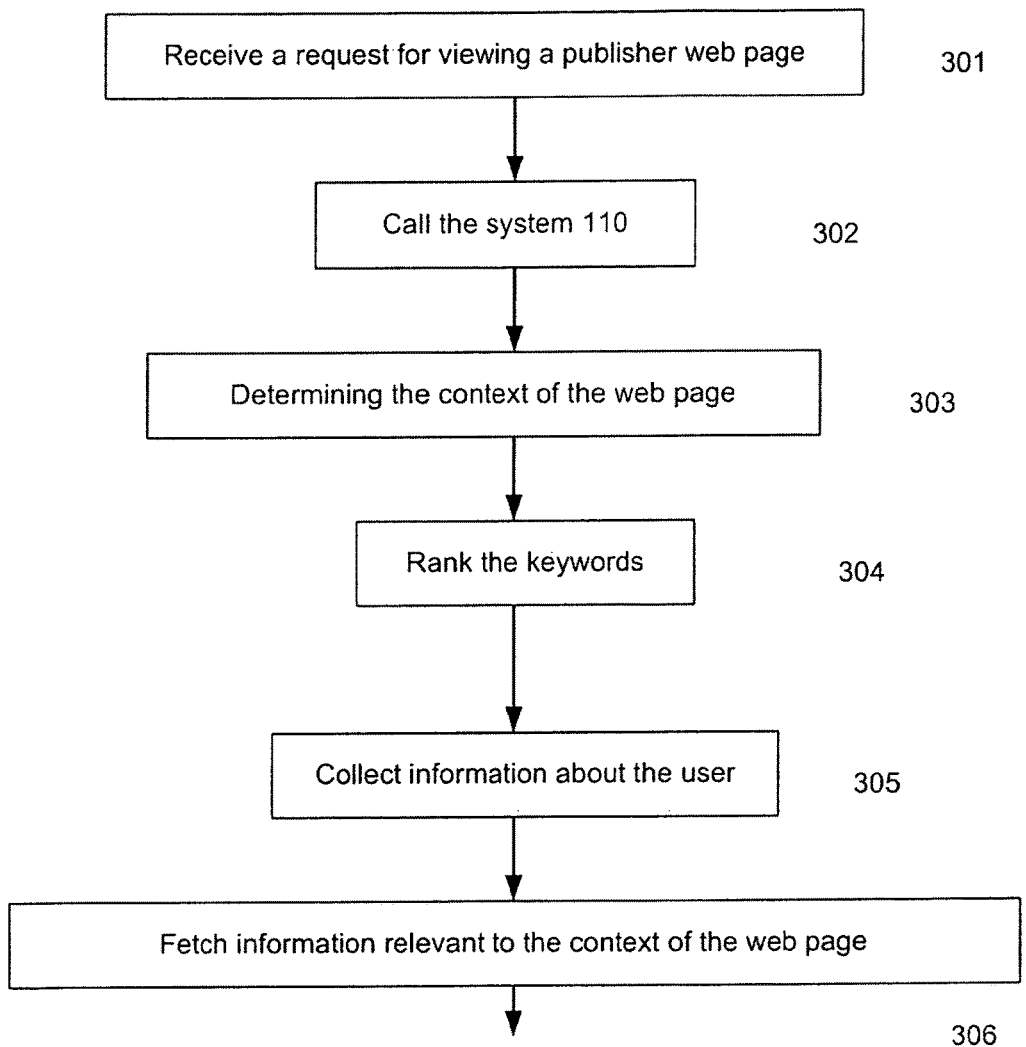
FIGS. 3A and 3B illustrate a flow chart of a method for presenting targeted advertisements according to one embodiment of the present invention.
Figure 3B:
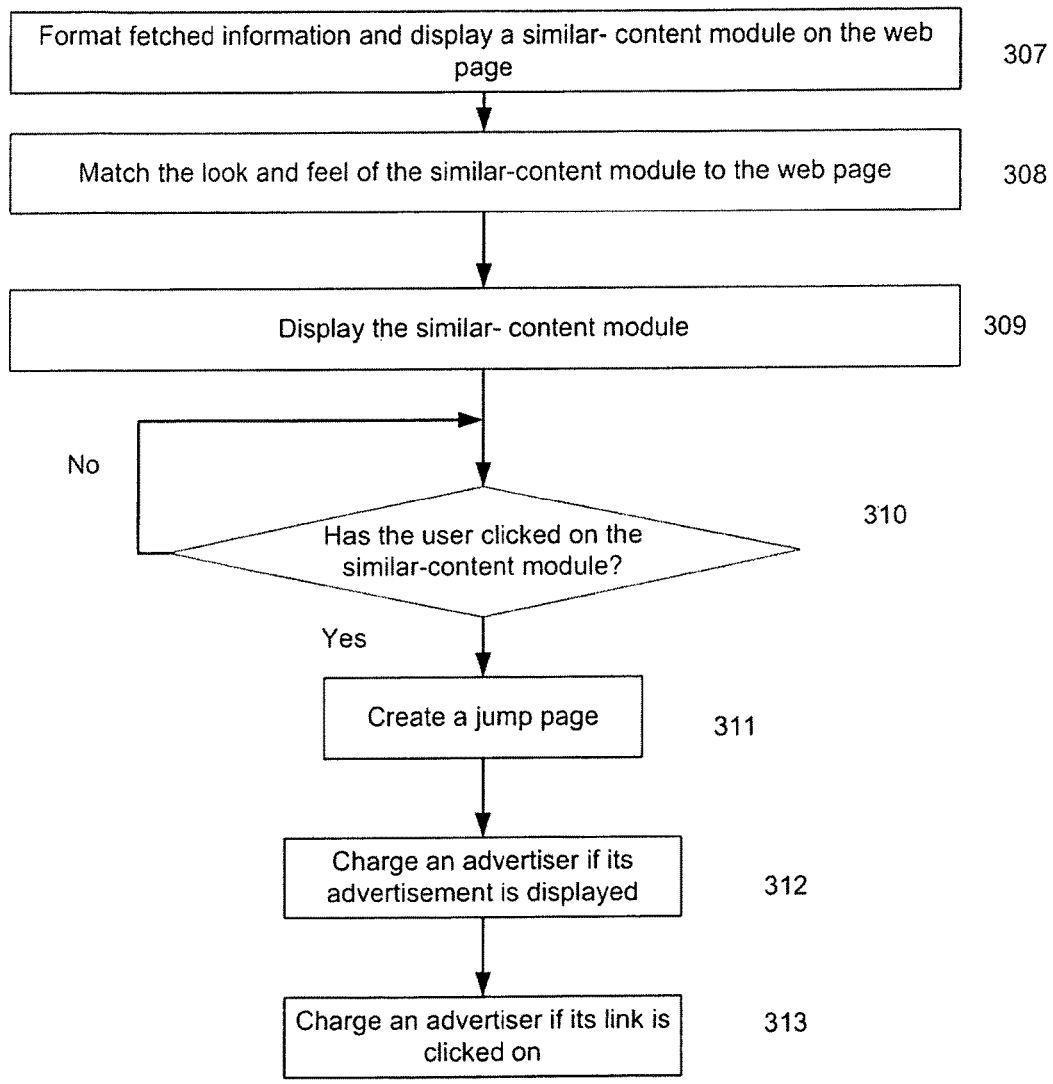

FIGS. 3A and 3B illustrate a flow chart of a method for providing targeted advertisements according to one embodiment of the present invention.

At 301, a publisher server 101 may receive a request from a user terminal, indicating for example that a user has input the words "San Francisco" and "sightseeing" in a search box. The publisher may have registered with the system 110, agreeing to include code that displays targeted advertising from the system 110 in exchange for a revenue share.

At 302, the web page code may call the system 110 with the URL of the web page.

At 303, the matching server 113 may determine its context. In one embodiment, the publisher server 101 may use the user input, "San Francisco" and "sightseeing," as keywords to provide context.

At 304, the matching server 113 may rank the keywords to more accurately identify the context of the web page, so as to provide better targeted advertising. Since the user has input "San Francisco" first, "San Francisco" may get a higher ranking than "sightseeing."

At 305, the matching server 113 may collect information about the user to fine-tune the advertisements for the user. In one embodiment, the matching server 113 may determine the user's geographic location by, e.g., cookies, or the user's IP address. With the geographic location information, the matching server 113 may decide that the user does not live in San Francisco, and may be interested in advertising about airline tickets from the user's location to San Francisco and hotels in San Francisco.

At 306, the matching server 113 may fetch information and advertisements relevant to context of the web page. For example, if the keywords are "San Francisco" and "sightseeing," and the user does not live in San Francisco, the matching server 113 may fetch advertisements about airline tickets, hotels and restaurants.

At 307, the matching server 113 may format the fetched information and advertisements and display it as a similar-content module on the web page. The similar-content module may include a map of San Francisco, with the most popular sightseeing locations marked. The map may also mark locations of popular hotels and restaurants. The similar-content module may also include consumer comments on the hotels and restaurants, best offers for airline tickets to San Francisco, etc.

At 308, the look and feel of the similar-content module may be matched with the web page on which it is displayed, to make users feel as if the similar-content module is an integrated part of the web page instead of a block later added for advertising purposes. In one embodiment, 308 may be performed by the visual contextual server 114. In another embodiment, 308 may be performed by the publisher using a widget creation tool.

At 309, code on the publisher web page may display the similar-content module.

At 310, it is determined whether a user clicked on the similar-content module.

If the user has clicked on the module, a jump page may be created at 311. (If not, the code may wait to see if the user will do that, but not so as to create an infinite wait loop; some other action may cause the code to exit the loop.) The jump page may present information in the similar-content module, e.g., user comments, in more detail. The jump page may present information in the similar-content module in a user interactive way. If the location of a hotel is marked on the map, the user may be sent to the website of the hotel if he clicks on the location. The jump page may also include advertisements of hotels, travel agencies, restaurants, shopping centers, etc.

If the jump page displays one or more advertisements, the advertiser(s) may be charged at 312 when the jump page is displayed. If the jump page has a link to the website of an advertiser, the advertiser may be charged at 313 when a user clicks on the link.

Several features and aspects of the present invention have been illustrated and described in detail with reference to particular embodiments by way of example only, and not by way of limitation. Those of skill in the art will appreciate that alternative implementations and various modifications to the disclosed embodiments are within the scope and contemplation of the present disclosure. Therefore, it is intended that the invention be considered as limited only by the scope of the appended claims.

What is claimed is:

1. A targeted advertisement presenting system, comprising:
 a registration server, configured to receive registration information relating to a web page; and
 a matching server, configured to:
  responsive to a request from the web page, determine a context of the web page;
  generate a similar-content module to be displayed on the web page, the similar-content module containing information that: [a] relates to the context of the web page, [b] does not result in an advertisement impression, and [c] relates to advertising content in an advertisement from an advertiser;
  determine whether a user clicked on the similar-content module on the web page;
  generate, when the user clicks on the similar-content module, a jump page that includes the advertisement or the advertising content from the advertiser;
  identify an impression based on a display of the jump page to the user; and
  identify a conversion when the user clicks the advertisement or the advertising content on the jump page.

2. The system of claim 1, wherein the matching server is further configured to fetch advertisements relevant to the context of the web page and according to a level of interest in the advertising content determined based on when a user clicks on the similar-content module.

3. The system of claim 1, wherein the jump page includes information in the similar-content module and advertisements.

4. The system of claim 1, further comprising a visual contextual server configured to match appearances of the similar-content module and the advertisement to the web page.

5. The system of claim 1, wherein the matching server is further configured to:
 receive user information; and
 use the user information to fetch advertisements.

6. The system of claim 5, wherein the user information comprises a geographic location of the user.

7. The system of claim 5, wherein the user information comprises browsing history of the user.

8. The system of claim 1, wherein the matching server is further configured to determine the context of the web page according to at least one keyword of the web page.

9. The system of claim 8, wherein the matching server is further configured to find the at least one keyword by crawling the web page.

10. The system of claim 1, wherein the matching server is further configured to:
determine the context of the web page according to at least two keywords of the web page; and
rank the at least two keywords.

11. The system of claim 1, wherein the matching server is further configured to charge the advertiser if the similar-content module is clicked on by the user.

12. The system of claim 1, wherein the impression comprises a charge to the advertiser when the advertiser's advertisement is displayed in the jump page.

13. The system of claim 1, wherein the conversion comprises a charge to the advertiser when a link to the advertiser's web page is clicked on in the jump page.

14. A method for presenting targeted advertisements, comprising:
receiving a request from a web page, at a network device;
determining a context of the web page, by a data processor included in the network device;
generating a similar-content module to be displayed on the web page, the similar-content module containing information that: [a] relates to the context of the web page, [b] is not an advertisement, and [c] relates to advertising content in an advertisement from an advertiser, by the data processor;
determining whether a user clicked on the similar-content module on the web page, by the data processor;
determining, by the data processor, a level of interest in the advertising content according to the determination of whether a user clicked on the similar-content module; and
controlling, by the data processor, displaying of a jump page which includes the advertising content or the advertisement, according to the level of interest.

15. The method of claim 14, further comprising controlling, by the data processor, the displaying of the corresponding advertisement according to the context of the web page.

16. The method of claim 14, further comprising determining, by the data processor, whether the similar-content module is clicked on by the user.

17. The method of claim 14, further comprising generating, by the data processor, a jump page which includes information in the similar-content module and advertisements.

18. The method of claim 14, further comprising matching, by the data processor, an appearance of the similar-content module to the web page.

19. The method of claim 14, further comprising controlling, by the data processor, the displaying of the advertisement, according to user information associated with the user.

20. The method of claim 19, wherein the user information comprises a geographic location of the user.

21. The method of claim 19, wherein the user information comprises a browsing history of the user.

22. The method of claim 14, further comprising determining, by the data processor, the context of the web page with at least one keyword of the web page.

23. The method of claim 14, further comprising determining, by the data processor, the context of the web page with at least two keywords of the web page.

24. The method of claim 17, further comprising charging, by the data processor, the advertiser when its advertisement is displayed in the jump page.

25. The method of claim 17, further comprising charging, by the data processor, the advertiser when a link to its web page, displayed on the jump page, is selected.

* * * * *